United States Patent Office 3,655,745
Patented Apr. 11, 1972

3,655,745
PREPARATION OF METHACRYLIC ACID
Donald M. Fenton, Anaheim, Calif., assignor to Union
Oil Company of California, Los Angeles, Calif.
No Drawing. Filed Sept. 6, 1968, Ser. No. 758,146
Int. Cl. C07c 57/04, 57/08
U.S. Cl. 260—526 N                                    7 Claims

ABSTRACT OF THE DISCLOSURE

Allyl compounds are reacted with carbon monoxide in the presence of a platinum group metal catalyst and a modifier which is a low molecular weight alkanoic acid and/or a hydrohalic acid to prepare alpha, beta-unsaturated carboxylic acids having a high content of desired methacrylic acid and minor amounts of crotonic acid as the major by-products. The contacting is effected at mild conditions with temperatures from 25° to 350° C. and pressures from 1 to about 1000 atmospheres and can be performed under vapor phase of liquid phase conditions, the latter being preferred. In a typical embodiment, allyl chloride is carbonylated by contacting the compound with carbon monoxide and an aqueous or anhydrous solution of acetic acid containing palladium at a temperature of about 150° C. to produce methacrylic and crotonic acids or anhydrides thereof.

DESCRIPTION OF THE INVENTION

The invention relates to carbonylation of allylic compounds under non-oxidizing conditions and in particular relates to the product of methacrylic acid from allylic compounds.

The carbonylation of allylic compounds has been previously attempted with platinum group metal catalysts and prior investigators have reported the insertion of carbon monoxide in such compounds to produce butenoic derivatives. Examples of such prior investigations are reported in Journal of Chemical Society (1964), pages 1852–3, and U.S. Pats. 3,309,403; 3,338,961 and 3,367,-961. In these investigations, carbon monoxide is reported to be inserted in allylic compounds, the reaction proceeding via the intermediate formation of $\pi$-allylic complexes with the platinum group catalyst and yielding acyl halides or butenoic acids by subsequent hydrolysis or alkyl butenoates by subsequent alcoholysis.

The allylic complexes with platinum group noble metals are symmetrical and the carbon monoxide insertion into such complexes results in the addition of the carbon monoxide to the terminal carbons of the allylic compound rather than the addition to secondary carbons. This reaction with the $\pi$-allylic complex proceeds at a high rate to the substantial exclusion of any carbon monoxide insertion or addition to the secondary carbons. Accordingly, the prior investigators have reported the production of the butenoic acid derivatives to the substantial exclusion of any methacrylic acid derivatives.

I have now found that the carbon monoxide attack on an allylic compound can be directed to the secondary carbon of the allylic compound by performing the reaction in the presence of a modifier which is a low molecular weight ($C_1$-$C_5$) alkanoic acid and/or a hydrohalic acid. While not wishing to be bound by any theory as to the mechanism of the reaction, I believe that the aforementioned acids complex with the noble metal to form hydrohalo or hydrocarboxyl complexes with the platinum group metal which inhibit the formation of a symmetrical allylic complex and orient the allylic compound to give a simple $\pi$ complex rather than the conventional allylic complex.

Regardless of the mechanism by which the intermediate complex is formed, I have found that the effect of the presence of an alkanoic and/or hydrohalic acid is to orient the reaction to the formation of the methacrylic acid derivatives which have a more valuable and established market than butenoic derivatives.

Various allylic compounds can be used as the reactants for this preparation of methacrylic acid. These allylic compounds include allylic halides, e.g., allyl chloride, allyl fluoride, allyl bromide, allyl iodide, allyl alcohol and its carboxylic $C_1$-$C_5$ esters, e.g., allyl formate, allyl acetate, allyl propionate, allyl butyrate, allyl pivalate, allyl valerate, allyl isovalerate, etc.

The contacting can be effected under vapor phase or liquid phase conditions. When vapor phase conditions are employed, the catalyst can be distended or supported on suitable insert support and the vapors of the reactants, acids and carbon monoxide can be passed over the supported catalyst with the products being removed from the vapor effluent of the reaction zone. With liquid phase processing, the reactants can be introduced in vapor or liquid form into a reaction zone which contains a liquid reaction medium having suspended or dissolved therein the platinum group metal containing catalyst. The reaction zone can be operated under conditions wherein the desired product is vaporized or stripped with a suitable inert gas from the liquid reaction medium and removed in a vapor effluent from the reaction zone. Alternatively, all or a portion of the liquid contents in the reaction zone can be continuously or intermittently withdrawn therefrom to obtain a liquid phase containing the catalyst and the acid products. The crude reaction product is withdrawn from the reaction zone, e.g., withdrawal of the vapor effluent from the vapor or liquid phase contacting zone, or withdrawal of a liquid phase from a liquid phase contacting zone, and the desired methacrylic acid and crotonic acid byproduct can be obtained in purified form by distillation of the withdrawn reaction zone effluent. When the effluent is in vapor phase it can be condensed and thereafter fractionated to obtain the products. When the reaction zone is maintained at temperature and pressure conditions which insure that the allylic reactant is in vapor state during the contacting, a vapor effluent containing excess allylic reactant can be withdrawn from the reaction zone and the allylic reactant can be recovered therefrom for recycling for further contacting to the reaction zone. In a similar fashion, carbon monoxide can also be removed in the vapor effluent, recovered therefrom, and returned for further contacting.

The catalyst is a platinum group metal containing catalyst and can comprise a metal of the platinum subgroup, i.e., platinum, iridium, or osmium, or a metal of the palladium subgroup, i.e., palladium, rhodium or ruthenium. Palladium is preferred. In general, the platinum group metal can be employed in amounts between about 0.001 and 5.0 weight percent of the liquid reaction medium, preferably between about 0.04 and about 0.5 weight percent. The platinum group metal can be introduced into the reaction medium as a finely divided metal, as an oxide, as a soluble salt or as a complex. Examples of suitable metal containing sources are the oxides, halides, sulfates, nitrates and salts of the lower $C_1$-$C_5$ carboxylates such as palladium oxide, palladium chloride, rhodium oxide, rhodium acetate, ruthenium dioxide, ruthenium bromide, osmium tetroxide, osmium trifluoride, iridium dioxide, iridium butyrate, iridium nitrate, palladium sulfate, platinum dichloride, platinum propionate or acetate, etc.

The Group VIII noble metals readily form complexes with various ligands such as the nitroso, halo or biphyllic ligand complexes and any of these can be used as the noble metal catalyst source. Complexes involving ligands with two or more complexing sites spaced in sufficient proximity to form a ring structure with the metal are chelates and any chelate of a Group VIII noble metal and a conventional metal chelating agent can be used.

Examples of suitable nitroso complexes include tristriphenylphosphine nitroso rhodium, tris-triphenylarsine nitroso rhodium, tris-triphenylphosphine nitroso iridium, rhodium nitroso bromide, palladium nitroso chloride, etc. Examples of halo complexes include: potassium hexafluororuthenate, sodium hexachloroosmate, lithium hexachloroiridate, chloroplatinic acid, sodium fluoropallate, etc.

Complexes of the Group VIII noble metal and a biphyllic ligand can also be used. The biphyllic ligand employed is a compound having an element with a pair of electrons capable of forming a coordinate bond with a metal atom and simultaneously having the ability to accept an electron from the metal of the catalyst. In this manner, the ligand imparts stability to the resulting complex of the catalyst. Biphyllic ligands can comprise organic compounds having at least about 3 carbons and containing arsenic, antimony or phosphorus in a trivalent state. Of these, the phosphorus compounds, i.e., the phosphines, are preferred; however, the arsines or stibines can be employed. In general, these biphyllic ligands have the following structure:

$$E(R)_3$$

or the following structure:

$$(R)_2ER'E(R)_2$$

wherein E is a trivalent atom selected from the class consisting of phosphorus, arsenic and antimony; and wherein R is a member of the class consisting of hydrogen, alkyl from 1 to 8 carbon atoms or aryl from 6 to 9 carbons; and wherein R' is alkylene having from 1 to about 8 carbons.

Examples of suitable biphyllic ligands having the aforementioned structure and useful in my invention to stabilize the catalyst composition are the following: trimethylphosphine, triethylarsine, triisopropylstibine, ethyldiisopropylstibine, tricyclohexylphosphine, triphenylphosphine, tri(o-tolyl)phosphine, phenyldiisopropylphosphine, phenyldiamylphosphine, diphenylethylphosphine, ethylene bis-(diphenylphosphine), hexamethylene bis(diisopropylarsine), pentamethylene bis(diethylstibine), etc. Of the aforementioned, the aryl phosphines are preferred because of their demonstrated greater activity for stabilization of Group VIII noble metal catalysts. The complex of the Group VIII noble metal and biphyllic ligand can be preformed or the components thereof can be added separately to the reaction zone.

Various chelates of Group VIII noble metals can be used such as the metal complexes with 1,3-diketones such as acetylacetone, propionylacetone, butyrolacetone, nonanoylacetone, benzoylacetone, etc.

When liquid phase reactant conditions are employed, the coreactant can be employed in excess and can thus comprise the liquid reaction medium, e.g., anhydrous or aqueous solutions of hydrohalic or alkanoic acids can be employed. With entirely anhydrous conditions, acid anhydrides can be formed; however, the acid can be readily obtained by hydrolysis of the anhydride simply by contacting the reaction product with water in a conventional manner. If desired, however, organic solvents which are liquid at the reaction conditions and inert to the reactants, products and catalysts, can also be employed as reaction solvents. Such solvents include for example: various ethers such as methylethyl ether, diethyl ether, diisopropyl ether, ethylene glycol diisoamyl ether, ethylbenzyl ether, diethylene glycol diethyl ether, triethylene glycol diethyl ether, tetraethylene glycol dimethyl ether, etc.

Various esters can also be employed as the solvents such as methyl acetate, ethyl acetate, isopropyl acetate, ethyl propionate, sec-butyl acetate, isobutyl acetate, ethyl n-butyrate, n-butyl acetate, isoamyl acetate, n-amyl acetate, glycol diformate, isoamyl n-butyrate, ethyl acetylacetate, diethyl oxalate, glycol diacetate, isoamyl isovalerate, methyl benzoate, ethyl benzoate, methyl salicylate, n-propyl benzoate, n-dibutyl oxalate, etc.

Saturated hydrocarbons can also be used such as pentane, hexane, heptane, octane, decane, dodecane, mineral oils, etc.

The carbonylation can be performed in heterogeneous vapor phase catalysis by employing the catalyst neat or supported on a suitable inert support in the reaction zone. Any support or carrier which is a solid and inert to the reaction can be used such as titania, zirconia, alumina, silica, etc., or combination of these materials. Examples include alumina, silica stabilized alumina containing from 1 to 15 percent silica as described in U.S. Pat. 2,437,532, the aluminum silicates, clay, naturally occurring or synthetically prepared zeolites such as chabizite, gnelenite or faujasite, as well as synthetic zeolites. The latter materials are partially dehydrated crystalline compositions of silica and alumina and contain quantities of one or more exchangeable cations such as sodium, potassium, hydrogen, magnesium, calcium, etc. The compositions and their preparation are described in U.S. Pats. 2,882,243 and 2,822,244. These compositions are characterized by crystal pores of relatively uniform pore diameter between about 5 and 14 Angstrom units. Several crystal forms of such molecular sieves are available and suitable for use herein as the carrier for the catalyst, redox agent and cocatalyst components of my invention including the "X," "Y," "L" and "J" crystal types. The sieves can be treated prior to deposition of the aforementioned catalytic metals by ion exchanging the monovalent alkali metal cation with a divalent metal. Also the sieves can be "decationized" by ion exchange with an ammonium salt followed by heating to decompose the zeolitic ammonium ion and leave a hydrogen ion. Any of the aforementioned carriers can be impregnated with appropriate aqueous solutions of salts of the Group VIII noble metals, redox metal or nitrogen oxide salts, and the quinone or hydroquinone cocatalyst.

The catalyst particle size can vary over wide limits from about 0.5 inch to about 1 micron average diameter. The particle size selected depends on the type of solid-vapor contacting employed in the reaction zone. A disperse gas phase reaction would employ the very fine particles passing about a 325 mesh screen. Use of a fluidized bed reactor would require use of particles passing a 20 but retained on a 400 mesh screen. Packed bed reactors, which are preferred, would use the larger diameter particles having diameters from 0.05 to 0.5 inch, preferably from about 0.1 to 0.25 inch. The specific surface of the catalyst can also vary widely, from about 10 to 800 square meters per gram.

The noble group metal component of the catalyst when distended on a solid carrier can be employed in an amount from about 0.01 to about 25 weight percent of the final catalyst. Preferably the noble metal is employed in a concentration from about 0.5 to about 10 weight percent based on the final catalyst. The noble metal can be distended on the carrier by impregnation of the carrier with a solution of a salt, complex or chelate of the noble metal. The impregnation can be achieved by evaporating the solvent from the admixture of inert carrier and catalyst solution or by addition of a precipitating agent to form an insoluble salt or hydroxide of the noble metal. The catalyst is thereafter dried and can be used in the carbonylation.

The reaction is performed under acid conditions in the presence of acids which are reaction modifiers and that are ligands for the catalyst, i.e., hydrohalic or $C_1$–$C_5$ alkanoic acids. Examples of suitable acids are: hydrochloric, hydrobromic, hydrofluoric, hydroiodic, acetic, propionic, n-butyric, sec-butyric, valeric, etc.

The carboxylic or hydrohalic acid can be used in proportions to the allyl compound in amounts from about 1:10 to about 10:1; preferably from about 1:1 to about 5:1; mols per mol of allyl compound. The acid should be employed in the aforementioned concentrations sufficient to inhibit the formation of allylic complexes between the allylic compound and the platinum group metal, yet should not be used in such concentrations as to inhibit the formation of a π complex between the platinum group metal catalyst and the allyl compound.

The reaction is performed at temperatures from about 25° to 350° C., preferably from about 75° to 275° C., and most preferably from about 125° to about 175° C. The reaction is performed at pressures from about 1 to about 1000 atmospheres. In vapor phase processing, the pressures can be from about 1 to about 500 atmospheres; preferably from 2 to about 20 atmospheres; the lower pressures being used to insure that the reactants and/or products are present in vapor form in the reaction zone. If desired, the reactants can be diluted with a suitable inert gaseous diluent, e.g., nitrogen, carbon dioxide, etc. With liquid phase processing, the pressures employed can preferably be from about 30 to about 200 atmospheres, sufficient to maintain liquid phase conditions and preferably sufficiently high to maintain an appreciable solubility of carbon monoxide in the liquid phase reaction medium.

The carbon monoxide can be supplied to the reaction zone in substantially equal molar quantities to the supply of the allylic reactant; however if desired, the ratio can be varied from about 1:10 to about 100:1 mols carbon monoxide per mol of the allylic reactant; preferably ratios from about 1 to 1 to about 15:1; most preferably from about 2:1 to 10:1 mols carbon monoxide per mol allylic reactant are employed.

The following examples illustrate a mode of practicing the invention and demonstrate results obtainable thereby:

EXAMPLE 1

A antalum-lined pressure bomb is charged with 25 milliliters allyl chloride, 100 milliliters acetic acid and 0.5 gram palladium chloride. The bomb is closed and pressured to 800 p.s.i.g. with carbon monoxide and then heated to and maintained at 120° C. for four hours while rocking to agitate the contents. The bomb is cooled, depressured and opened upon completion of the reaction period and the contents thereof are distilled to recover 4 grams methacrylic acid, 2 grams crotonic acid and 0.5 gram isobutyric acid.

The experiment is repeated with the addition of 10 milliliters water. The bomb is heated to 175° C. and maintained at that temperature for four hours. Methacrylic and crotonic acids are recovered as the products of the reaction.

When the experiment is repeated with the substitution of 0.5 gram platinum bromide for the palladium chloride, reaction to produce methacrylic and crotonic acids still occurs.

EXAMPLE 2

The bomb is charged with 25 milliliters allyl chloride, 75 milliliters formic acid and 0.5 gram palladium chloride, then closed and pressured to 400 p.s.i.g. with carbon monoxide. The bomb is rocked, heated to and maintained for six hours at 100° C., then cooled, depressured and opened and the contents analyzed to determine that isobutyric, methacrylic and crotonic acids were formed.

EXAMPLE 3

A steel bomb is charged with 25 milliliters allyl acetate, 75 milliliters acetic acid, 6 grams water, 0.5 gram palladium chloride and 2 grams triphenylphosphine. The bomb is closed and pressured to 800 p.s.i.g. with carbon monoxide, then heated to and maintained at each of the following temperatures for two hours while rocking the bomb to agitate its contents; 75° C., 125° C. and 175° C. Thereafter the bomb is cooled, depressured and opened and the liquid contents analyzed to reveal 1.5 grams methacrylic acid and 3.0 grams crotonic acid.

EXAMPLE 4

The tantalum bomb is charged with 25 milliliters allyl acetate, 100 milliliters acetic acid, 3 grams triphenylphosphine, 0.5 gram palladium chloride and 15 milliliters concentrated hydrochloric acid. The bomb is closed and pressured to 800 p.s.i.g. with carbon monoxide, then heated to and maintained at 125° C. for six hours while rocking the bomb to agitate its contents. The bomb is cooled, depressured and opened and the liquid contents analyzed to reveal 1.5 grams isobutyric and 1.1 grams methacrylic acids. The catalyst is recovered as a greenish-yellow solid with a melting point of 295–300° C. and is active for subsequent experiments.

EXAMPLE 5

The tantalum bomb is charged iwth 1 gram palladium chloride, 100 milliliters acetic acid, 25 milliliters allyl alcohol and 2 grams of a hydrogen charged Y-type zeolite. The zeolite is obtained by ion exchanging ammonium for sodium in a zeolite having the following empirical formula:

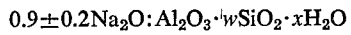

$$0.9\pm0.2Na_2O:Al_2O_3\cdot wSiO_2\cdot xH_2O$$

where $x=0$ to 9 and $w=3$ to 6. The ammonium form is then heated to decompose the ammonium to the hydrogen form of the zeolite. The bomb is then closed, pressured to 800 p.s.i.g. with carbon monoxide, heated to and maintained at 100° C. for two hours, and then heated to and maintained at 175° C. for an additional two hours. The bomb is then cooled, depressured and opened and the contents distilled to recover methacrylic acid.

EXAMPLE 6

A tubular reactor is charged with a catalyst comprising 2.0 weight percent palladium deposited on one-eighth inch silica pellets. The reactor is positioned vertically and has a top gas inlet and bottom product effluent line that passes through water-cooled condensed and a Dry Ice-acetone cooled trap. A stream of nitrogen at 400 p.s.i.g. is passed through a vessel containing allyl chloride at 120° C., then through a vessel containing acetic acid at 165° C. to prepare a vapor mixture of allyl chloride and acetic acid which is passed over the solid catalyst at about 165° C. and 400 p.s.i.g. The liquid products collected in the condenser receiver and Dry Ice trap are sampled and found to contain methacrylic and crotonic acids.

The preceding examples are intended solely to illustrate a mode of practice of the invention and to demonstrate the results obtainable thereby. It is not intended that the examples be unduly restrictive of the invention, but instead it is intended that the invention be defined by the steps and reagents and their obvious equivalents set forth in the following claims.

I claim:

1. The carbonylation of allylic compounds to produce methacrylic derivatives which comprises contacting an allylic compound selected from the class consisting of allyl halides and allyl alcohols and $C_1$–$C_5$ carboxylic acid esters thereof with carbon monoxide at a temperature from 25° to about 350° C. and a pressure from 1 to about 1000 atmospheres in the presence of a platinum group metal catalyst and from about 0.1 to 10 mols per mol of said allylic compound of a catalyst modifier selected from the class consisting of hydrohalic and $C_1$–$C_5$ alkanoic acids to thereby produce said methacrylic derivatives.

2. The method of claim 1 wherein said catalyst is a palladium metal containing catalyst.

3. The method of claim 2 wherein said contacting is effected under liquid phase conditions.

4. The method of claim 2 wherein said contacting is effected under vapor phase conditions.

5. The method of claim 2 wherein said allylic compound is allyl chloride.

6. The carbonylation of allylic compounds to produce methacrylic acid which comprises contacting an allylic compound selected from the class consisting of allyl halides and allyl alcohols and $C_1$–$C_5$ carboxylic acid esters thereof with carbon monoxide at a temperature from 25° to about 350° C. and a pressure from 1 to about 1000 atmospheres in a liquid reaction medium containing from about 0.01 to 5 weight percent of palladium or platinum and from 0.1 to 10 mols per mol of said allylic compound of a $C_1$–$C_5$ alkanoic acid.

7. The carbonylation defined in claim 6 wherein said reaction medium also contains a hydrohalic acid and wherein the total amount of said hydrohalic acid and said alkanoic acid in said liquid reaction medium is from 0.1 to 10 mols per mole of said allylic compound.

References Cited

UNITED STATES PATENTS

| | | | |
|---|---|---|---|
| 3,338,961 | 7/1967 | Closson et al. | 260—526 |
| 3,437,676 | 4/1969 | Kutepow et al. | 260—532 |
| 3,457,299 | 7/1969 | Closson et al. | 260—526 |

OTHER REFERENCES

Tsuji et al.: J. Amer. Chem. Soc., vol. 86 (1964), pp. 4350–3.

JAMES A. PATTEN, Primary Examiner

U.S. Cl. X.R.

260—532, 540